SQUEEGEE ASSEMBLY FOR SCREEN PROCESS PRINTERS OF MICRO-CIRCUITS AND COMPONENTS THEREOF

Filed May 18, 1967

INVENTOR

DANIEL C. HUGHES, JR.

BY Sperry and Zoda

ATTORNEYS

United States Patent Office 3,483,819
Patented Dec. 16, 1969

3,483,819

SQUEEGEE ASSEMBLY FOR SCREEN PROCESS PRINTERS OF MICRO-CIRCUITS AND COMPONENTS THEREOF

Daniel C. Hughes, Jr., Somerville, N.J., assignor to Precision Systems Company Inc., Bound Brook, N.J., a corporation of New Jersey Filed May 18, 1967, Ser. No. 639,514
Int. Cl. B41f *15/42*
U.S. Cl. 101—123 4 Claims

ABSTRACT OF THE DISCLOSURE

A squeegee assembly for screen process printers of micro-circuits and components thereof includes a squeegee of square cross section. The major portion of the squeegee is clamped between blocks of a holder movable toward and away from the screen. By forming the squeegee to a square cross section with one corner serving as a wiping edge, the remaining corners may be received and subjected to slight compression in confronting, correspondingly shaped recesses of the blocks. The squeegee is thus held rigidly against lateral deformation, to promote uniform application of pressure to the squeegee over the full extent of its wiping contact with the screen.

BACKGROUND OF THE INVENTION

Field of the invention

The invention pertains to the art of screen process printing as employed in the microelectronic field. Within this broadly stated category there is embraced the printing of discrete components such as capacitors, thermistors, and piezoelectric devices; seals, that is, the selective printing of metallizing compositions on such surfaces as high alumina and beryllia ceramics for seals and conductive paths; printed-and-fired thick film integrated and hybrid circuits; and fluidics.

In a more particular sense, the field of art to which the invention pertains is the construction and operation of the squeegee assembly comprising an essential part of screen process printing apparatus of the kind herein discussed.

Description of the prior art

In general, most of the screen printers in use for the purposes described are "flat bed" devices with horizontal work carrier and squeegee travel attitudes. Usually, the screen is fixed, while the squeegee assembly moves in respect thereto (though it is known to hold the squeegee stationary while moving the screen in wiping contact therewith). Parts to be printed are carried from an outside load position horizontally under the screen, and the screen fixed "off contact" with reltaion to the part, that is, the screen is not totally in contact with the part being printed at any time. A quantity of ink is deposited in the screen, and in use, the squeegee is brought into contact with the screen, with a predetermined pressure being applied to the squeegee to an extent such as to cause the wire or mesh of the screen to be stretched or flexed just sufficiently to effect contact of the mesh directly under the squeegee with the surface of the substrate (workpiece). As the squeegee thereafter wipes across the screen while being held under the aforementioned pressure, the mesh of the screen snaps back into place behind the squeegee.

Printing is accomplished because of a number of factors. It is believed that primarily the speed of squeegee travel, and the angle of attack (that is, the attitude with respect to the screen) of the squeegee blade causes a hydraulic pressure type of action wherein the ink is forced through the screen mesh and into contact with the substrate. It may be noted that ink does not normally flow or leak through the screen. Because the ink in the screen mesh has a greater affinity for the substrate than for the mesh, it is pulled free of the mesh as the screen snaps away from the substrate after passage of the squeegee.

Heretofore, the squeegee has taken a variety of forms. For example, flat squeegee stock has been employed, and is disposed in a position of inclination with respect to the plane of the screen, so as to apply only a corner of the stock to the screen. Or, in another flat form, the edge is bevelled with the squeegee being disposed in a plane perpendicular to the plane of the screen. In every instance, the squeegee is intended to present a comparatively even, sharp edge to the screen, and to define an angle of 45° to 60° between the leading surface of the squeegee and the screen, thus to push a roll of ink ahead of the squeegee while at the same time creating a pressure upon the ink forcing it through the screen. All forms heretofore employed incorporate designs that produce considerable flexure of excess, unsupported squeegee stock, and this in turn has caused undesired variations in printing uniformity.

The clamping means whereby the squeegee is attached to its holder, too, have had the disadvantage of causing localized bulges in the wiping edge of the squeegee, adding still further to a lack of complete uniformity of printing upon the substrate.

Still further, the mounting of the various squeegee designs heretofore employed has been of what may be appropriately called a "floating" nature, that is, the line defined by the wiping edge of the squeegee is free to conform to the screen and to the surface being printed upon by travel about a pivot axis parallel to the screen and disposed upwardly therefrom. This also has tended to produce a lack of printing uniformity.

SUMMARY OF THE INVENTION

Compartively recent improvements in tensioning of screens, in surfaces to be printed upon, and in basic machine mounting design, support a conclusion that a "floating" mounting is less desirable where uniform films are required. In accordance with the present invention, accordingly, a "rigid" mounting is provided, in combination with a particular squeegee shape, that eliminates, to all intents and purposes, any variations in the approach or attack angle. Flexure of the squeegee about a pivot axis or axes parallel to the plane of the screen is precluded.

This is effected through the provision of a squeegee assembly that incorporates a support block on which is mounted a holder for a squeegee. The holder has motion with respect to the support block toward and away from a screen, so that the squeegee can be advanced into contact with the screen, after which a traverse of the squeegee across the screen (or a traverse of the screen across the squeegee) is effected to force the ink through the interstices of the screen and deposit it upon the adjacent substrate. The squeegee element is square in cross section, and the holder for the squeegee comprises a pair of clamping blocks, one of which is approximately of inverted L shape, to define a right-angular recess therein adapted to receive the other block. The blocks are connected by means of screws, so as to cause them to be drawn toward each other into gripping engagement with a squeegee disposed therebetween. The blocks have confronting, right-angular recesses for the squeegee, and these recesses are so shaped as to cause the greatest part of the squeegee to be confined rigidly between the blocks, in a slightly compressed state. One corner of the squeegee projects, and this corner defines the wiping edge that is brought into contact with the screen.

Means, in the form of an air cylinder, are provided upon the support block, to advance and retract the squeegee holder, and cause the squeegee to be maintained against the screen under pressure sufficient to press the screen against the work piece during the traverse of the squeegee.

DESCRIPTION OF THE PREFERRED EMBODIMENT

Figure 4:
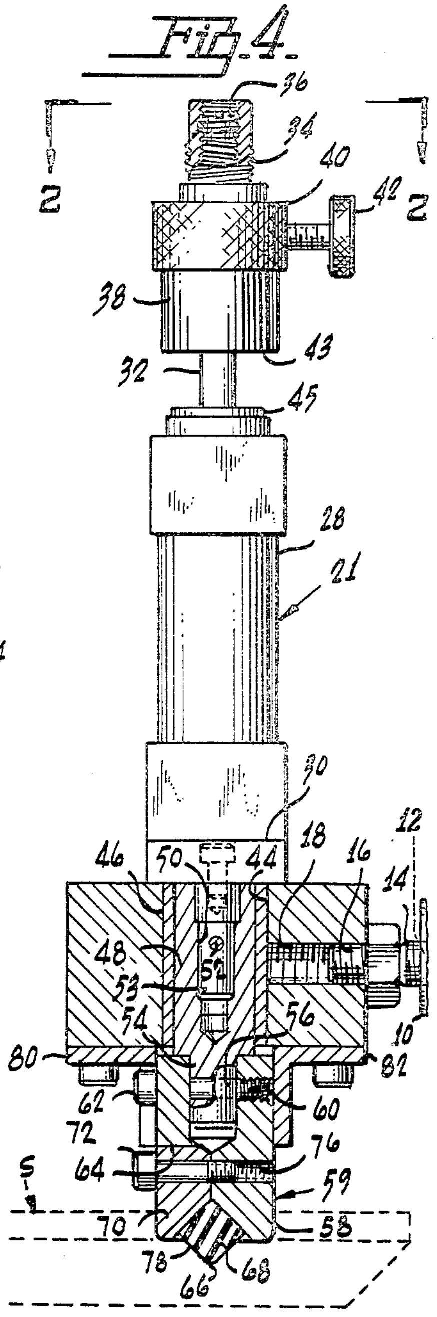
FIGURE 4 is a view of the squeegee assembly partly in side elevation and partly in section, substantially on line 4—4 of FIGURE 3.

In the illustrated example of the invention, there has been shown a squeegee assembly of the type that is movable with respect to a stationary screen S shown in dotted lines in FIGURE 4. The squeegee assembly is part of a complete screen process printing apparatus, which is basically conventional and hence is not shown in the drawing. It is sufficient to note that carried by the support frame of said apparatus is an air cylinder or equivalent means, not shown, the movable plunger or piston rod of which is provided with a coupling 10 formed with socket 12 receiving stud 14 one end of which is threadedly engaged in the socket, the other end being threaded as at 16 for engagement in the rearwardly opening, horizontal, threaded bore 18 of a rectangular guide or support block 20 that comprises a part of the squeegee assembly generally designated 21 and forming the present invention.

Figure 2:
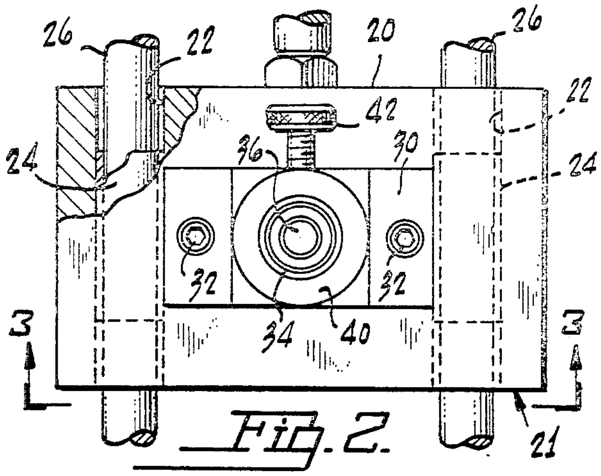
FIGURE 2 is a top plan view, portions being broken away, of the squeegee assembly.

Guide block 20 includes parallel bores 22 (FIGURE 2), in which bushings 24 are engaged, slidably receiving guide rods 26 carried by the frame of the apparatus. In this way, block 20 is mounted for slidable movement on rods 26, above the fixed screen S. The movement of the guide block is effected by operation of the pneumatic pressure developed by the air cylinder, not shown, to the plunger of which stud 14 and hence block 20 is connected.

Mounted upon and extending upwardly from block 20 is an air cylinder 28. This is mounted through the provision of a support flange or mounting bracket 30, having feet 31 formed with openings receiving mounting screws 32 threadedly engaged in threaded recesses 33 of block 32 threadedly engaged in threaded recesses 33 of block 20.

A sleeve 34 is provided with a threaded bore, engaged with the threaded upper end portion of the plunger or stem 32 of air cylinder 28. Sleeve 34 is thus adjustable longitudinally of stem 32, and is locked in selected positions of adjustment through the provision of a lock screw 36 that is threaded into the upper end of the sleeve, to bear against the end of the stem 32.

External threads on the sleeve are provided, engaging the threads of an elongated nut 38 having a knurled collar 40 to facilitate adjustment of the nut longitudinally of sleeve 34. The nut has a radial, threaded opneing receiving set screw 42 which bears against sleeve 34 to hold the nut in selected positions of adjustment longitudinally of the sleeve. The nut defines, at its lower end, a stop shoulder 43 adapted to bear against a washer 45 extending about the stem at the upper end of the air cylinder.

In this way, downward movement of the stem 32 in respect to the barrel of the cylinder and hence in respect to the block 20 also, is limited by movement of stop shoulder 43 into engagement with the washer 45. Adjustments can be effected with respect to the extent of downward movement of the stem before it is so limited against further motion, as described above. The stem carries with it the squeegee, so that the adjustable downward travel of the stem effects a corresponding adjusted, downward movement of the squeegee in respect to the plane of the screen.

Referring to FIGURE 4, centrally formed in block 20 is a through opening which, in the illustrated, exemplary mounting of the squeegee assembly is vertically disposed. Said opening or bore, designated 44, is provided with a bushing 46, and vertically slidable in the bushing in a connecting pin 48 having an upwardly opening, stepped axial recess 50. A dowel 52 extends through registered openings of pin 48 and extension 53 of the plunger or stem 32. The extension 53 of the stem or rod 32 is stepped correspondingly to the bore or recess 50. Pin 48 and stem 32 constitute a plunger or stem assembly.

Integrally formed upon the lower end of the connecting pin or coupling 48 is an axial, reduced extension 54. This extends into an upwardly opening recess 56 formed in a horizontally extending clamping block 58 of a squeegee holder generally designated 59. Block 58 can be of any length desired, the length being determined by the width of the screen, that is, by the particular size of the printing apparatus. In any event, the clamping block 58 extends transversely of the line of travel of the block 20 as it moves back and forth upon the guide rods or bars 26.

Clamping block 58 (see FIGURES 1 and 4) has a forwardly opening, threaded aperture 60, receiving a screw 62, which passes also through a smooth walled opening formed diametrically in axial extension 54 of coupling or connecting pin 48. Thus, block 58, and hence the entire squeegee holder and squeegee, are connected through coupling 48 to the stem of the air cylinder, for advancement toward or retraction from the mesh surface of screen S. Air cylinder 28, stem 32, connecting pin 48, sleeve 34, nut 38, and collar 40 together constitute a means for advancing and retracting the squeegee holder 59.

Figure 1:
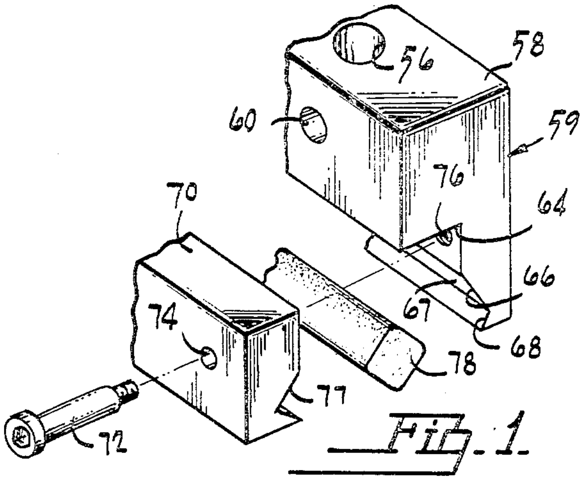
FIGURE 1 is a fragmentary, exploded perspective view of the squeegee and the clamping blocks.

Referring to FIGURES 1 and 4, a right-angular recess 64 is formed in the lower portion of block 58, opening forwardly and downwardly. In the vertical wall surface of said recess, a second right-angular recess 66 is provided. This recess, however, does not have its wall surfaces disposed horizontally and vertically as is true of the respective surfaces of recess 64. Rather, the perpendicularly related surfaces 67, 68 of recess 66 are disposed at an angle of 45° of the vertical. Surface 67, that is, the upper surface of recess 66, is substantially greater in width than the lower surface 68 which, as will be noted, terminates at the bottom extremity of clamping block 58.

A second clamping block 70 is substantially smaller than the block 58. Block 70 is coextensive in length with the block 58, extending transversely across the screen in parallel relation to block 58. Clamping block 70 is adapted to fit into the main right angular recess 64 of the block 58, and is secured to block 58 through the provision of a plurality of connecting screws 72 that extend through smooth-walled openings 74 of block 70 to engage in threaded recesses 76 formed in the vertical wall of recess 64 of the main clamping block 58. Blocks 58 and 70 together comprise squeegee holder 59.

Block 70 is formed with a right-angular recess 77 that is in confronting relation to the recess 66 of block 58. Recess 77, thus, has perpendicularly related surfaces disposed at angles of 45° from the horizontal. Further, the upper, inclined surface of the recess 77 is of a width corresponding to the width of the surface 67, while the corresponding to the inclined lower surface of recess 66 of block 58.

When the block 70 is drawn toward block 58 by screws 72, a squeegee 78 is gripped by the blocks, fitting snugly into the complementary recesses 66, 77. Squeegee 78, in length, corresponds with the length of the clamping blocks 58, 70, and in cross section, is square as clearly seen from FIGURES 1 and 4. The squeegee is resiliently deformable material, and it will be noted at this point that said material may vary as desired. Commonly, in the art, neoprene or polyurethane have been employed. While these materials have certain disadvantages, and may in the future give way to improved materials, they are satisfactory for present purposes and either may be employed in carrying out the present invention. It is believed that in future constructions, it may even be possible to employ stainless steel, which of course would be dimensionally accurate, would be of completely rigid construction, and would hold any predetermined angle. This may be coated with a plastic or synthetic material having a predetermined yieldability to provide a cushioning action as a preventive against undue wear of the screen.

Whatever the material employed for the squeegee, it will be understood that the dimension of the squeegee in relation to the cross sectional area of the cavity defined by the confronting recesses of the clamping blocks, would be selected to cause the squeegee to be rigidly held, in fact slightly compressed between the clamping blocks. In view of the particular form and arrangement of the recesses of said blocks, the major portion of the squeegee area, viewing the same in cross section as in FIGURE 4, is confined in sai cavity, and only the lower corner portion of the squeegee projects below the squeegee holder. This corner portion serves as the wiping edge, that contacts the screen, and exerts a slight pressure against the screen in the direction of the underlying work piece, not shown. In view of the fact that the square cross sectional area of the squeegee is turned to locate the upper and lower corners of the squeegee in line with the path of advancement of the squeegee toward the screen, sloped surfaces will be defined at both sides of the wiping edge, disposed at angles of 45° to the plane of the mesh of the screen.

Thus, in use, the ink is pushed along in front of the squeegee, and at the same time, due to the inclined surface of the squeegee, is pressed through the interstices of the mesh of the screen, for deposit upon the work.

The construction is one which permits use of the invention on a screen process printer of the type in which the printing action is effected only during travel of the block in one direction. The construction, further, allows use of the squeegee in apparatus wherein the printing action is carried out during both forward and return movement of the block. Both types of printers are well known in the field to which the invention pertains.

Figure 3:
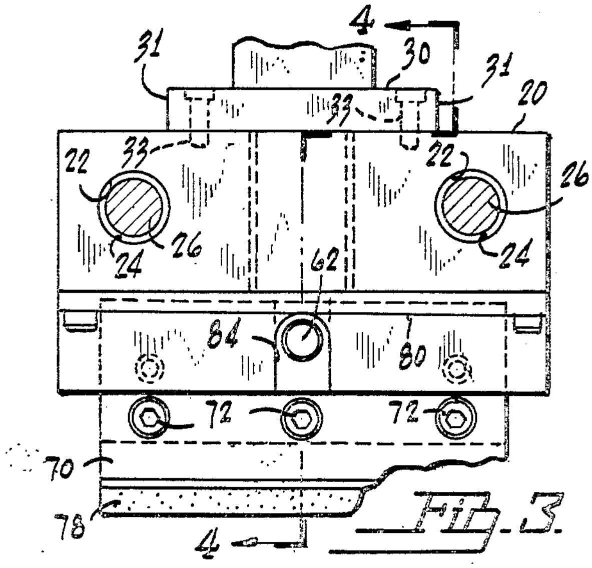
FIGURE 3 is a view of said assemblies substantially on line 3—3 of FIGURE 2, portions being broken away.

It will be observed that means should be provided to prevent the squeegee holder from rotating about an axis defined by the stem 32. Accordingly, retaining plates 80, 82 of right-angular cross section are attached by screws or equivalent means to the underside of block 20, in positions such that depending, vertical portions of said plates bear against the front and rear surfaces, respectively, of the squeegee holder 59. The front retaining plate 80 may be provided with a slot 84 (FIGURE 3) to provide a clearance for the head of screw 62.

In use, the air cylinder 28 would be operated in timed relation to the operation of the air cylinder that moves block 20 between the opposite limits of its travel along bars 26. If the printer is one in which the printing action is effected only in one direction, the air cylinder would be designed to lower the squeegee holder into engagement with the screen at the beginning of travel in said one direction, after which the squeegee holder would be raised and held in an elevated position while the block is returned to its initial position for repetition of the printing operation.

When the printing is to be carried out in both directions, the squeegee holder would be lowered into engagement with the screen, and would be in a lowered position during travel of the block in either direction.

I claim:

1. In a screen process printer for microcircuits and components thereof, of the type in which a squeegee and a generally flat stationary screen are mounted with the squeegee movable while in wiping contact with the screen so as to press an ink through the interstices of the screen in a predetermined pattern on to an adjacent workpiece, an improved squeegee assembly comprising:

(a) a support block mounted for reciprocating movement solely in a straight line parallel to the plane of the screen;

(b) a squeegee holder mounted on said block for reciprocating movement normal to the line of movement of the support block, said normal movement being solely in a straight line toward and away from said screen;

(c) a squeegee carried by and movable bodily with said holder, said squeegee having an edge held in wiping engagement with the screen at a selected, predetermined attitude in respect thereto when the holder is advanced toward the screen, said squeegee being of substantially square cross-section and the holder including clamping blocks between which the squeeze is tightly gripped whereby said edge is rigidly supported by the holder against lateral deviation from said attitude; and (d) means mounted on the block for moving said holder toward and away from the screen, said means for moving the squeegee holder toward and away from the screen including a plunger assembly mounted for axial reciprocation in said second-named line of movement of the holder and having a fixed connection to the holder, means interengaging the plunger assembly and support block against relative rotation about the axis of the plunger assembly, and means on the block for reciprocating the plunger assembly.

2. In a screen process printer for micro-circuits and components thereof, an improved squeegee as in claim 1 wherein the means for reciprocating the plunger assembly includes an air cylinder fixedly secured to and projecting outwardly from the block, said plunger assembly including a stem reciprocably mounted in said cylinder.

3. In a screen process printer for micro-circuits and components thereof, an improved squeegee assembly as in claim 2, further including a stop mounted on the stem for adjustment axially thereof and engaging against the cylinder on movement of the stem toward the screen, for selective adjustment of the wiping contact of the squeegee with the screen.

4. In a screen process printer for micro-circuits and components thereof, an improved squeegee assembly as in claim 1 wherein the plunger assembly includes a stem and a connecting pin coaxial with and fixedly connected to the stem, the support block having a bore in which said pin is slidably mounted to guide the plunger assembly in its reciprocating movement in the second named straight line, said holder being secured to said pin against rotation in respect thereto, said means interengaging the block and plunger assembly against relative rotation comprising at least one retaining plate affixed to the block and bearing against a surface of the holder laterally outwardly from the axis of the plunger assembly.

References Cited

UNITED STATES PATENTS

| | | | |
|---|---|---|---|
| 3,199,448 | 8/1965 | Jaffa et al. | 101—123 |
| 1,861,610 | 6/1932 | Respress | 101—123 |
| 2,295,979 | 9/1942 | Van Gorden | 101—123 |
| 2,580,814 | 1/1952 | Morley | 15—245 |
| 2,799,223 | 7/1957 | Dubuit | 101—115 |

FOREIGN PATENTS

| | | |
|---|---|---|
| 1,178,062 | 12/1958 | France. |

ROBERT E. PULFREY, Primary Examiner

EUGENE H. EICKHOLT, Assistant Examiner

U.S. Cl. X.R.

118—120